(12) United States Patent
Brinas

(10) Patent No.: US 9,341,386 B2
(45) Date of Patent: May 17, 2016

(54) VEHICULAR AIRFLOW OUTLET

(71) Applicant: GM GLOBAL TECHNOLOGY OPERATIONS LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 13/658,262

(22) Filed: Oct. 23, 2012

(65) Prior Publication Data

US 2014/0113537 A1    Apr. 24, 2014

(51) Int. Cl.
*B60H 1/34* (2006.01)
*F24F 13/075* (2006.01)
*B60H 1/00* (2006.01)

(52) U.S. Cl.
CPC ............ *F24F 13/075* (2013.01); *B60H 1/3414* (2013.01); *B60H 1/00871* (2013.01); *B60H 2001/3471* (2013.01)

(58) Field of Classification Search
CPC ...... B60H 1/3421; B60H 1/3414; B60H 1/34; B60H 1/345; B60H 1/00678; B60H 1/00671; B60H 1/00857; B60H 1/00685; B60H 1/00852; B60H 1/00871; B60H 2001/3471; B60H 2001/3478; B60H 2001/3464; B60H 2001/00721; B60H 2001/007; B60H 2001/00707
USPC ........................................................ 454/155
See application file for complete search history.

(56) References Cited

U.S. PATENT DOCUMENTS

| | | | | |
|---|---|---|---|---|
| 2,939,376 A | * | 6/1960 | Goettl | F24F 13/075 454/314 |
| 2,959,117 A | * | 11/1960 | Wright | F24F 13/075 454/314 |
| 2,996,970 A | * | 8/1961 | Goettl | F24F 13/15 454/314 |
| 2,996,971 A | * | 8/1961 | Goettl | F24F 13/075 454/314 |

(Continued)

FOREIGN PATENT DOCUMENTS

| | | |
|---|---|---|
| DE | 19851490 A1 | 5/2000 |
| EP | 1209012 A2 | 5/2002 |

(Continued)

*Primary Examiner* — Alissa Tompkins
*Assistant Examiner* — Frances F Hamilton
(74) *Attorney, Agent, or Firm* — Quinn Law Group, PLLC

(57) ABSTRACT

A vehicular airflow outlet comprising a plurality of outlet units having an airflow unit, a ball joint, and a connection member; a control knob unit including a control knob coupled to a ball joint; and a connection mechanism configured to couple the ball joint of the each of the outlet units and the ball joint of the control knob unit is provided. The airflow outlet allows for the direction of airflow throughout a vehicle passenger compartment without the use of multiple sets of vanes. The airflow outlet directs airflow through the use of a single control knob. Force applied to the face of the control knob is operable to simultaneously pivot the ball joints of each of the plurality of outlet units and the ball joint of the control knob unit in unison to adjust airflow direction, allowing for the direction of air at a variety of angles.

20 Claims, 6 Drawing Sheets

(56) References Cited

U.S. PATENT DOCUMENTS

| | | | | |
|---|---|---|---|---|
| 3,096,703 A * | 7/1963 | Goettl | F24F 13/075 384/209 |
| 3,724,149 A * | 4/1973 | Detman | E04B 1/32 454/368 |
| 3,835,759 A * | 9/1974 | Lloyd | B60H 1/3442 251/352 |
| 4,006,673 A * | 2/1977 | Meyer | B60H 1/3442 251/352 |
| 4,413,551 A * | 11/1983 | Jackson | B60H 1/3414 239/553 |
| 4,653,385 A * | 3/1987 | Ito | B60H 1/3414 454/143 |
| 4,669,370 A * | 6/1987 | Hildebrand | B60H 1/3435 454/155 |
| 4,702,155 A * | 10/1987 | Hildebrand | B60H 1/3435 454/155 |
| 5,036,753 A * | 8/1991 | Ostrand | B60H 1/345 454/155 |
| 5,356,336 A * | 10/1994 | Stouffer | B60H 1/34 454/155 |
| 5,733,189 A * | 3/1998 | Eastwood | B60H 1/3442 454/155 |
| 5,890,958 A * | 4/1999 | Greiner | B60H 1/3414 454/155 |
| 5,921,860 A * | 7/1999 | Marsden | B60H 1/3414 454/152 |
| 5,967,891 A * | 10/1999 | Riley | B60H 1/3442 454/154 |
| 6,159,092 A * | 12/2000 | Elder | B60H 1/3421 454/152 |
| 6,533,655 B2 * | 3/2003 | Demerath | B60H 1/3421 454/155 |
| 6,736,719 B1 * | 5/2004 | Gehring | B60H 1/3421 454/143 |
| 6,830,511 B2 * | 12/2004 | Gehring | B60H 1/3421 454/152 |
| 6,896,610 B2 * | 5/2005 | Pesch | B60H 1/3414 454/155 |
| 7,056,203 B2 * | 6/2006 | Shibata | B60H 1/3428 454/155 |
| 2004/0063397 A1 * | 4/2004 | Dippel | B60H 1/3407 454/154 |
| 2004/0127153 A1 * | 7/2004 | Demerath | B60H 1/3421 454/155 |
| 2004/0171345 A1 * | 9/2004 | Pesch | B60H 1/3414 454/319 |
| 2007/0243816 A1 * | 10/2007 | Russak | F04D 25/166 454/208 |
| 2008/0171509 A1 * | 7/2008 | Grossmann | B60H 1/00871 454/155 |
| 2011/0195650 A1 * | 8/2011 | Uhlenbusch | B60H 1/3442 454/152 |
| 2014/0364045 A1 * | 12/2014 | Noichl | B60H 1/3421 454/155 |

FOREIGN PATENT DOCUMENTS

| | | |
|---|---|---|
| EP | 1344668 A2 | 9/2003 |
| GB | 2094467 A | 9/1982 |
| GB | 2224827 A | 5/1990 |

\* cited by examiner

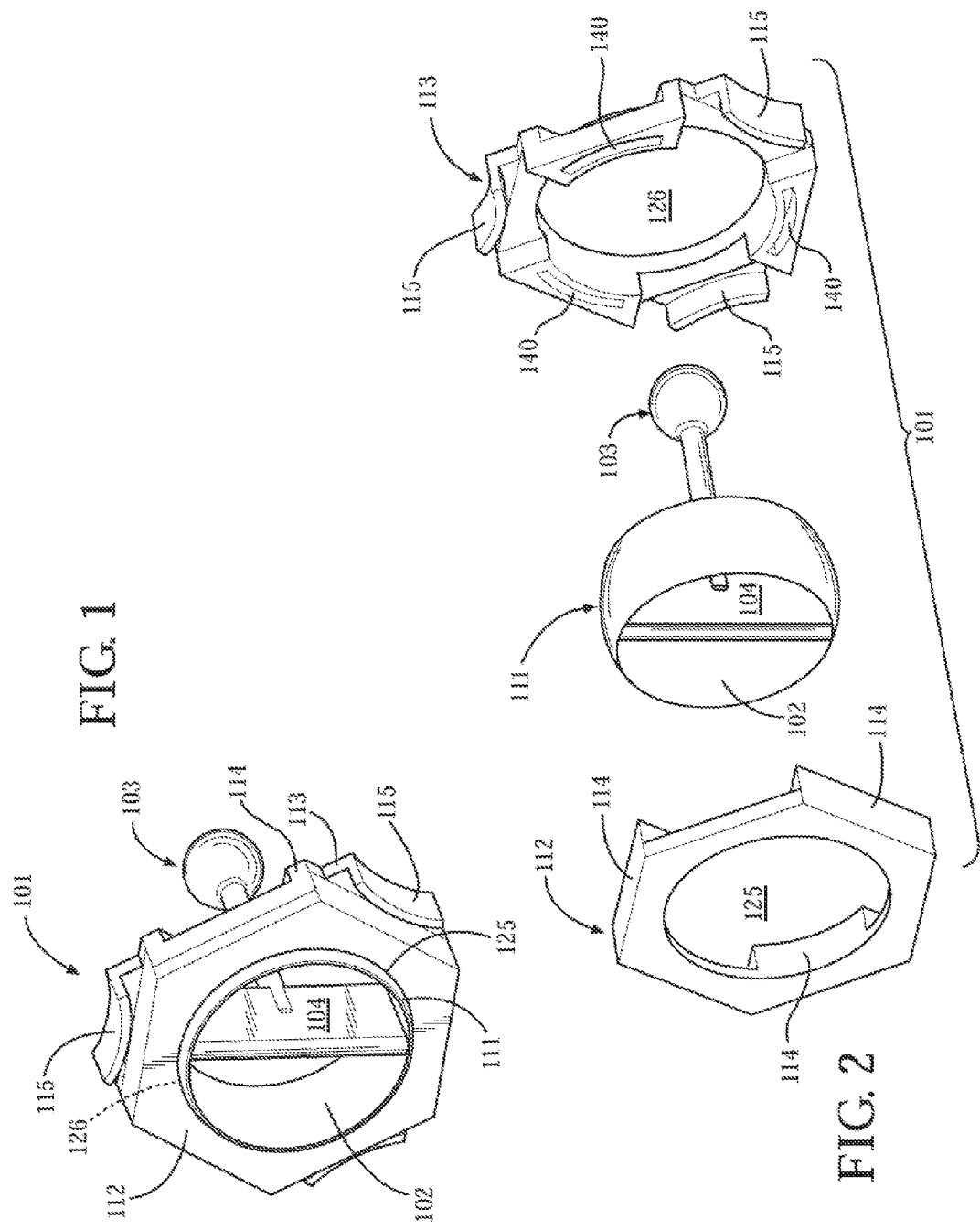

VEHICULAR AIRFLOW OUTLET

TECHNICAL FIELD

The disclosure generally relates to an airflow outlet, particularly to an airflow outlet for vehicular Heating Ventilation and Air Conditioning (HVAC) systems.

BACKGROUND

Conventional vehicle interiors include airflow systems for passenger comfort. These systems deliver heated or cooled air produced through an HVAC system. The air is transmitted into the vehicle passenger compartment through a plurality of airflow outlets.

The directional flow of air through the outlets is generally manually controllable through the use of multiple sets of directional vanes, including at least a primary set of vanes and a secondary set of vanes. The vanes are generally controlled with thumb wheels or the like, to restrict, meter, or completely block airflow to the passenger compartment. Generally, the primary set of vanes is configured to direct airflow horizontally across the passenger compartment. The secondary set of vanes is configured to direct airflow vertically between the floor and ceiling of the passenger compartment. Alternatively, the primary set of vanes is configured to direct airflow vertically between the floor and the ceiling of the passenger compartment and the secondary set of vanes is configured to direct airflow across the passenger compartment.

SUMMARY

A vehicular airflow outlet is provided. The airflow outlet may include a plurality of outlet units, each outlet unit may include an airflow unit, a ball portion, and a connection member. Each airflow unit may define a cavity. The connection member may be disposed within the cavity defined by the airflow unit and the ball portion may be coupled to the connection member.

The airflow outlet may further include a control knob unit including a control knob having a first face side and a second connection side, the control knob unit further including a ball portion coupled to the second connection side. The plurality of outlet units and the control knob unit may be coupled and interconnected to form an outlet array. The airflow outlet may further include a connection mechanism configured to couple the ball portions of each of the outlet units and the ball portion of the control knob unit when arranged in an outlet array.

The direction of airflow flowing through the plurality of airflow units may be controlled by force applied to the first face side of the control knob. The force applied to the first face side of the control knob may be transitioned to apply force upon the ball portion of the control knob unit and the ball portion of each of the outlet units through the connection mechanism, to rotate all ball portions in unison to adjust airflow direction. Such a configuration allows for direction of air at a variety of angles throughout the vehicle passenger compartment without the requirement of multiple sets of directional vanes.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1 is a schematic perspective view of one outlet unit.
FIG. 2 is a schematic exploded view of one outlet unit.

DETAILED DESCRIPTION

Figure 3:
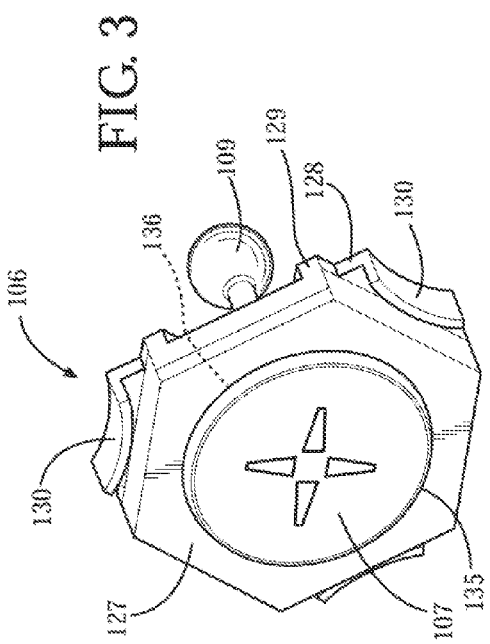
FIG. 3 is a schematic perspective view of the control knob unit.

Referring to the Figures, wherein like reference numbers correspond to like or similar components throughout the several views, a vehicular airflow outlet 100 is provided. Referring generally to FIGS. 1-8, a plurality of airflow outlets 100, as shown in FIG. 7, may form a vehicular airflow outlet system. The plurality of outlets 100 may be arranged throughout the passenger compartment of a vehicle to promote heating and cooling of the passenger compartment to improve passenger comfort. The vehicular airflow outlet 100 may generally include a plurality of outlet units 101, a control knob unit 106, and a connection mechanism 110. The vehicular airflow outlet 100 may also include a trim plate 122 and a housing 124.

Referring to FIG. 1 and FIG. 2, the vehicular airflow outlet 100 may include a plurality of outlet units 101. Each of the respective outlet units 101 may include an airflow unit 111. The airflow unit 111 of each of the respective outlet units 101 may define a cavity 102, the cavity 102 configured to allow air to flow therethrough and into the passenger compartment of the vehicle.

Each of the respective outlet units 101 may also include a ball portion 103 and a connection member 104. The connection member 104 may be disposed within the cavity 102 defined by the airflow unit 111. The ball portion 103 may be coupled to and extend from the connection member 104. Each of the airflow unit 111, ball joint 103, and connection member 104 may be formed of a polymeric material.

Each of the respective outlet units 101 may also include a first interlocking portion 112 and a second interlocking portion 113. Each of the first interlocking portion 112 and the second interlocking portion 113 may be formed in the shape of any even-sided polygon having at least four sides, such as a square, hexagon, octagon, decagon etc. Each of the first interlocking portion 112 and second interlocking portion 113 may be formed of a polymeric material.

The first interlocking portion 112 may define a cavity 125 therein for receiving the airflow unit 111. The first interlocking portion 112 may have a first plurality of retention features 114 extending from the first interlocking portion 112, such as a set of tabs or the like. The first plurality of retention features 114 may vary in number but will likely correspond in number to the number of polygonal sides of the first interlocking portion 112.

The second interlocking portion 113 may define a cavity 126 therein for receiving the airflow unit 111. The second interlocking portion 113 may have a second plurality of retention features 115 extending from the second interlocking portion 113, such as a set of tabs or the like. The second plurality of retention features 115 may vary in number but will likely correspond in number to the number of polygonal sides of the second interlocking portion 113. The second interlocking portion 113 may also define a plurality of slots 140.

The second plurality of retention features 115 may be configured to engage the first plurality of retention features 114 in order to couple the first interlocking portion 112 and the second interlocking portion 113 about the airflow unit 111. In one example, the plurality of slots 140 defined by the second interlocking portion 113 may be configured to receive the first plurality of retention features 114 creating an interlocking engagement coupling the first interlocking portion 112 and the second interlocking portion 113.

Figure 4:
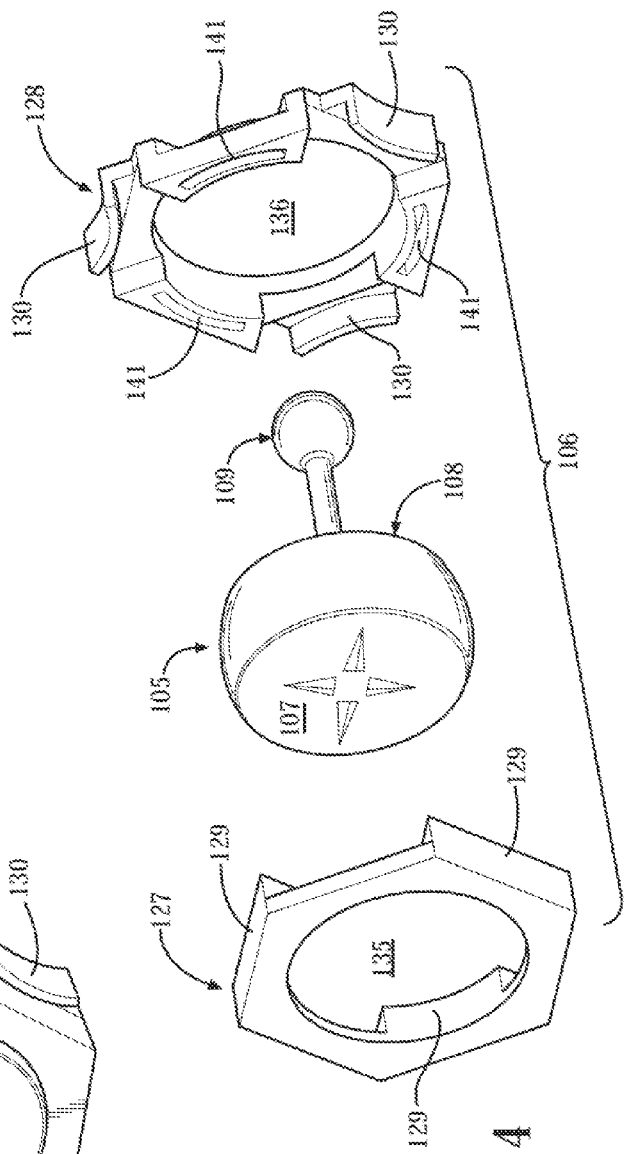
FIG. 4 is a schematic perspective view of the control knob unit.

Referring to FIG. 3 and FIG. 4, the vehicular airflow outlet 100 may include a control knob unit 106 including a control knob 105 having a first face side 107 and a second connection side 108. The control knob unit 106 may also include a ball portion 109 coupled to and extending form the second connection side 108 of the control knob 105. Each of the control knob 105 and the ball portion 109 may be formed of a polymeric material.

The control knob unit 106 may also include a first interlocking portion 127 and a second interlocking portion 128. Each of the first interlocking portion 127 and the second interlocking portion 128 may be formed in the shape of any even-sided polygon having at least four sides, such as a square, hexagon, octagon, decagon etc. Each of the first interlocking portion 127 and second interlocking portion 128 may be formed of a polymeric material.

The first interlocking portion 127 may define a cavity 135 therein for receiving the control knob 105. The first interlocking portion 127 may have a first plurality of retention features 129 extending from the first interlocking portion 127, such as a set of tabs or the like. The first plurality of retention features 127 may vary in number but will likely correspond in number to the number of polygonal sides of the first interlocking portion 127.

The second interlocking portion 128 may define a cavity 136 therein for receiving the control knob 105. The second interlocking portion 128 may have a second plurality of retention features 130 extending from the second interlocking portion 128, such as a set of tabs or the like. The second plurality of retention features 130 may vary in number but will likely correspond in number to the number of polygonal sides of the second interlocking portion 128. The second interlocking portion 128 may also define a plurality of slots 141.

The second plurality of retention features 130 may be configured to engage the first plurality of retention features 129 in order to couple the first interlocking portion 127 and the second interlocking portion 128 about the control knob 105. In one example, the plurality of slots 141 defined by the second interlocking portion 128 may be configured to receive the first plurality of retention features 129 creating an interlocking engagement coupling the first interlocking portion 127 and the second interlocking portion 128.

Figure 5:
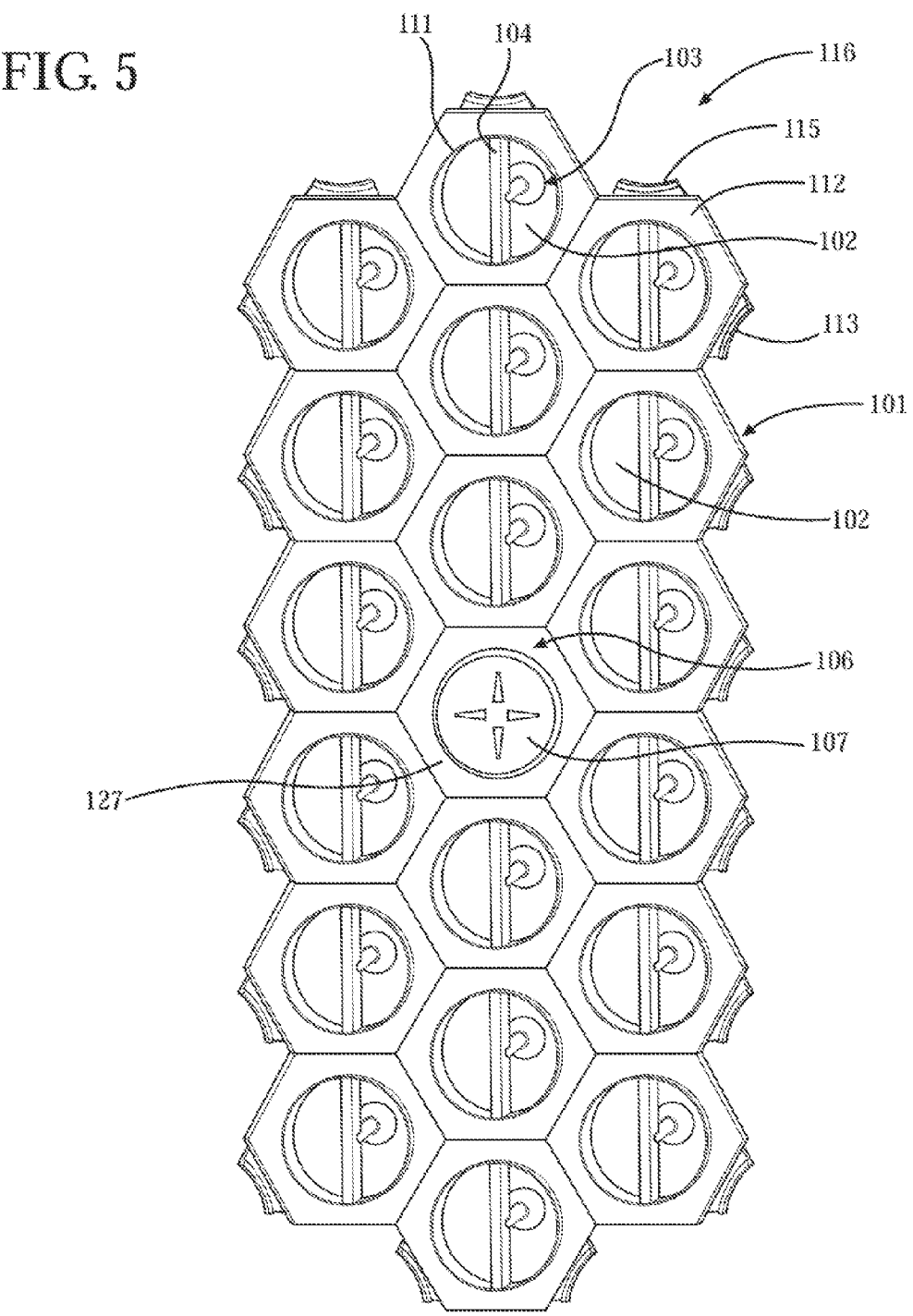
FIG. 5 is a schematic front-side elevation view of an outlet array including a plurality of outlet units and a control knob unit.

Referring to FIG. 5, the plurality of outlet units 101 and the control knob unit 106 may be arranged in an interlocking engagement forming an outlet array 116. Referring generally to FIGS. 1-5, when formed in an outlet array 116 the first plurality of retention features 114, 129 and the second plurality of retention features 115, 130 of each of the outlet units 101 and the control knob unit 106 engage one another and couple each of the plurality of outlet units 101 and the control knob unit 106 to form the outlet array 116.

In one example, each of the respective outlet units 101 and the control knob unit 106 are engaged in an outlet array 116 by engaging each of the respective first plurality of retention features 114, 129 of each of the respective first interlocking portions 112, 127 of each of the respective outlet units 101 and control knob unit 106 into the slots 140, 141 defined by each of the respective second interlocking portions 113, 128.

Figure 6:
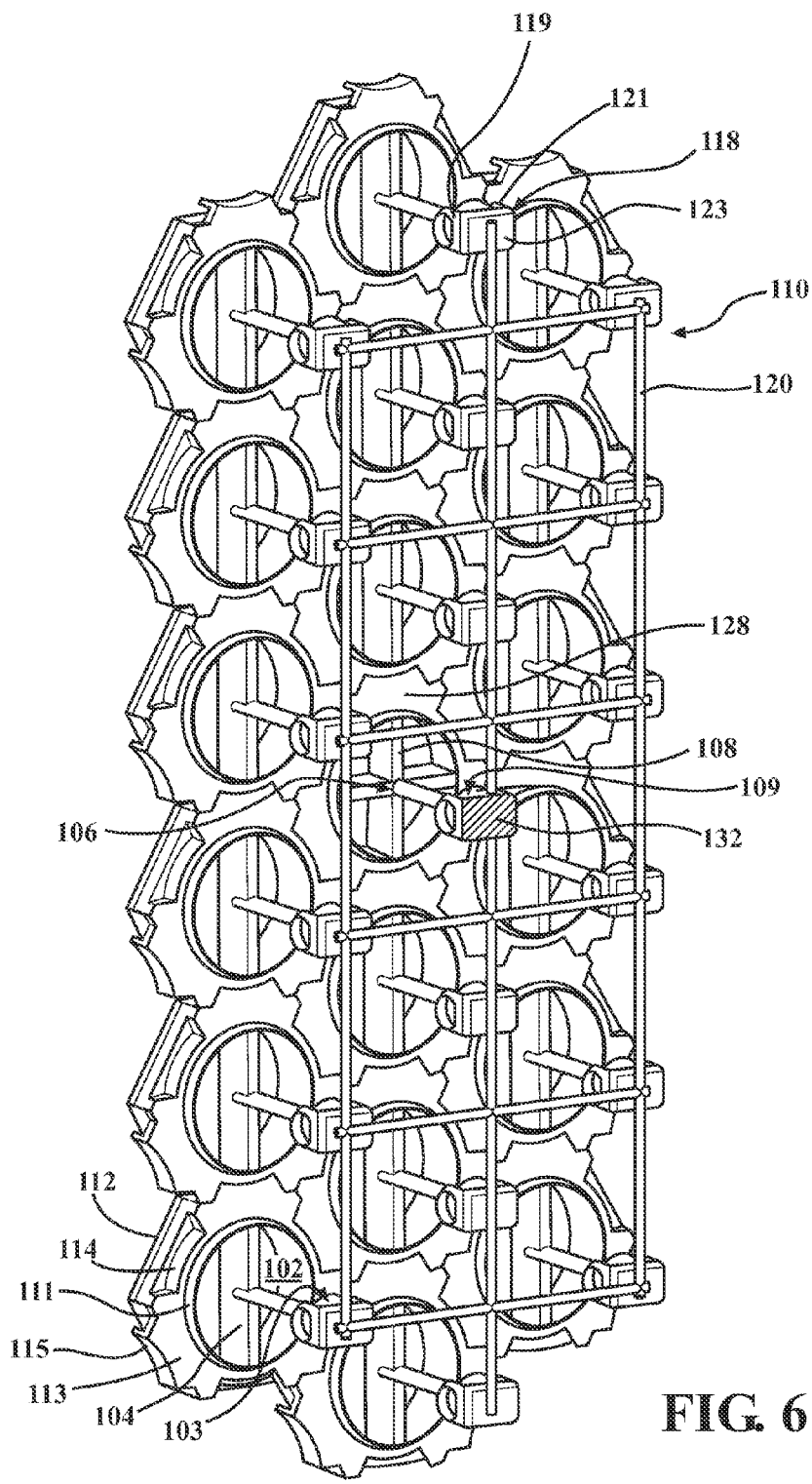
FIG. 6 is a schematic back-side perspective view of the outlet array showing each of the respective outlet units and control knob unit coupled by the connection mechanism.
Figure 7:
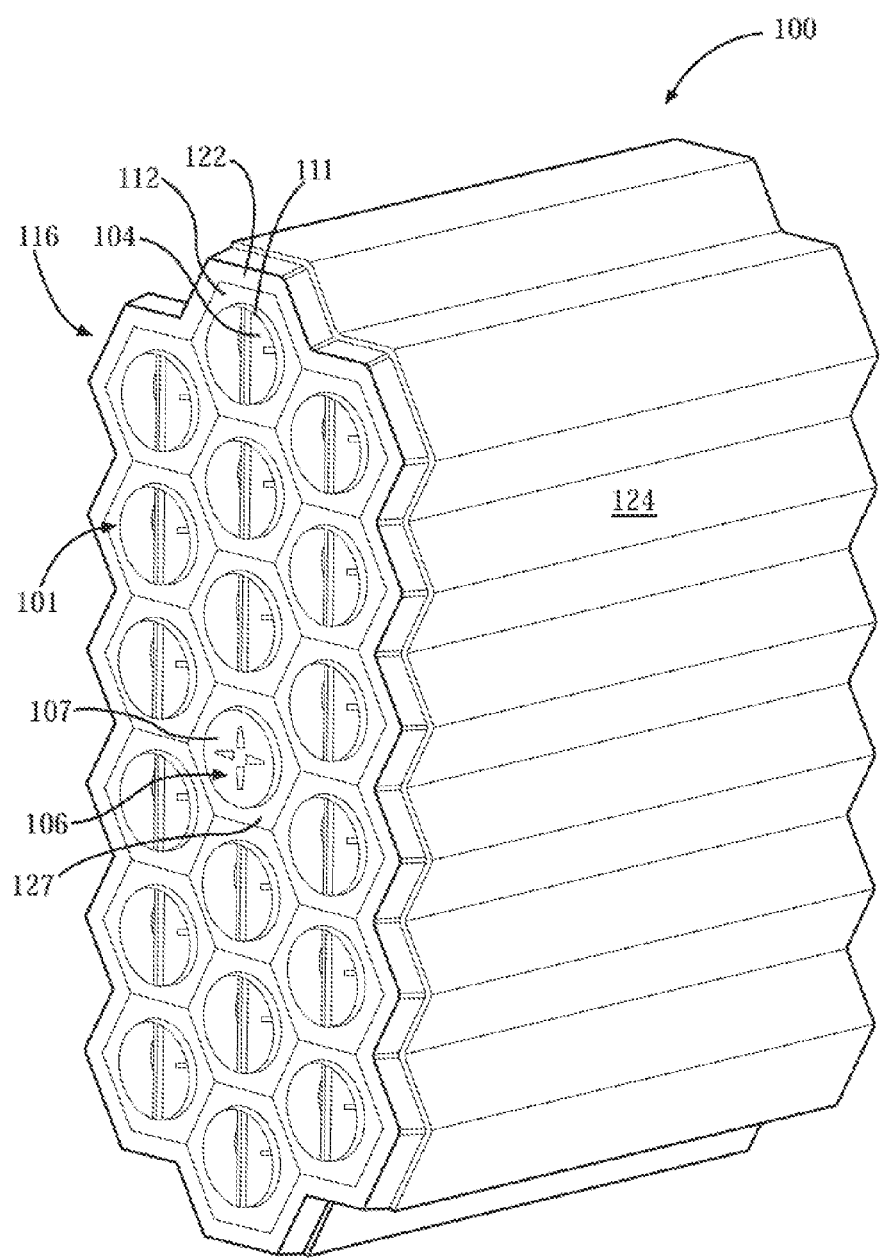
FIG. 7 is a schematic assembled view of the vehicular airflow outlet.

Referring to FIG. 6, when the plurality of outlet units 101 and the control knob unit 106 are arranged in an interlocking engagement forming an outlet array 116, the ball portion 103 of each of the respective outlet units 101 and the ball portion 109 of the control knob unit 106 may be coupled by a connection mechanism 110. The connection mechanism 110 may include a plurality of joint sockets 118. The number of joint sockets 118 of the connection mechanism 110 may be equal to the number of outlet unit 101 ball joints 103 and control knob unit 106 ball joints 109 present in the outlet array 116.

Each of the respective joint sockets 118 may include a first portion 119 and a second portion 121. The first portion 119 and second portion 121 may be coupled by an intermediate section 123. Each of the respective joint sockets 118 may be configured to secure one of an outlet unit ball portion 103 and a control knob unit ball portion 109 between the first portion 119 and second portion 121.

The plurality of joint sockets 118 may be interconnected and coupled with a bracket interlocking array 120. Coupling of the plurality of joint sockets 118 with the bracket interlocking array 120 creates a rigid system, which forces each of the respective outlet unit ball portion 103 to move in unison with the control knob unit ball portion 109. Such, unitary movement allows for control of the airflow flowing through each outlet 100 in a variety of directions without the need for multiple sets of directional vanes.

The rigid system and the airflow through the each outlet unit 101 is controlled by force applied to the first face side 107 of the control knob 105. The force applied to the first face side 107 is transitioned to the ball portion 109 of the control knob unit 106 and the ball portion 103 of each the plurality of outlet units 101 through the connection mechanism 110.

Each of the respective joint sockets 118 and the bracket interlocking array 120 may be formed of a polymeric material. Additionally, the interconnection between the joint socket 118 coupled to the ball portion 109 of the control knob unit 106 and the bracket interlocking array 120 may be reinforced with an overmold, bracket, or the like 132.

Figure 8:
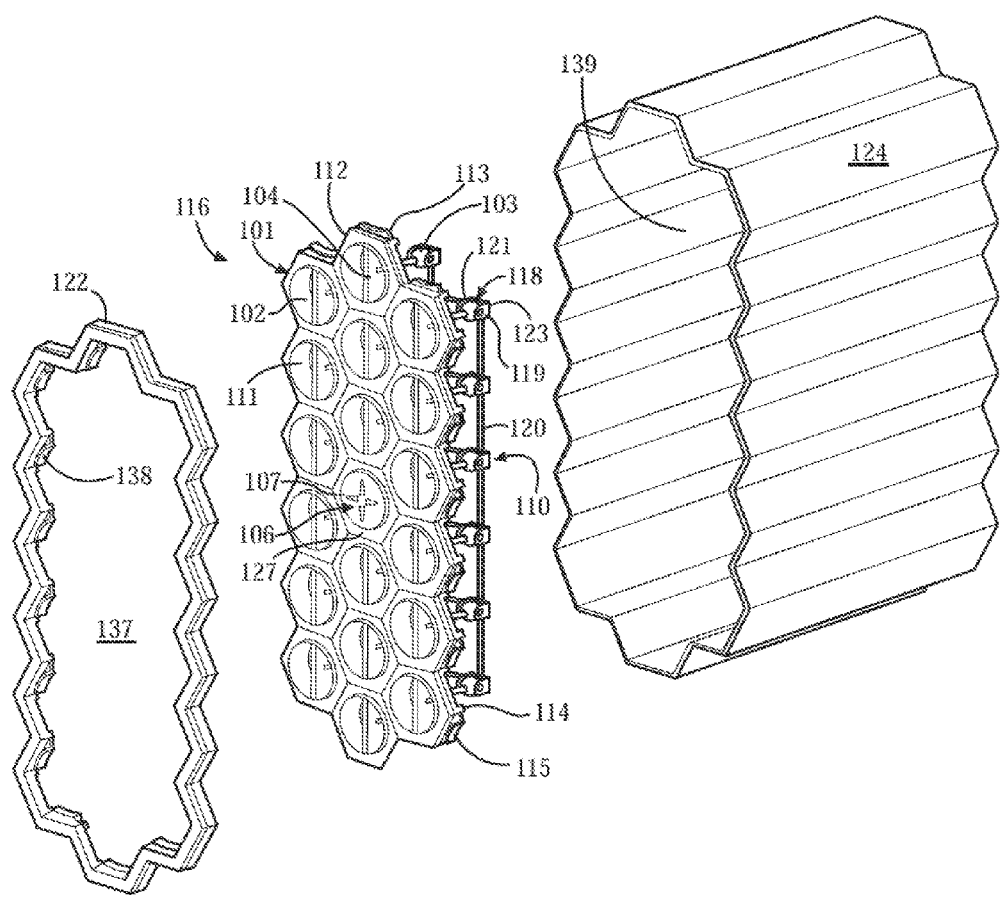
FIG. 8 is a schematic exploded view of the vehicular airflow outlet.

Referring to FIGS. 7 and 8, the airflow outlet 100 may also include a trim plate 122 defining an interior void 137. The trim plate 122 may be configured to encase the outlet array 116, wherein the outlet array 116 is disposed within the interior void 137. The trim plate 122 may include a set of trim plate retention features 138 that may engage or interlock with the first plurality of retention features 114 and the second plurality of retention features 115 of the outlet units 101 forming the outer edge of the outlet array 116, thereby securing the outlet array 116 in the interior void 137. The at least one outlet 100 may also include a housing 124, defining a cavity 139 therein. The housing cavity 139 may be configured to receive the outlet array 116 and the trim plate 122.

The configuration of the airflow outlet 100 allows for airflow throughout the passenger compartment at a variety of angles without the need for both a primary horizontal and a secondary vertical set of vanes, while maintaining the overall amount of airflow supplied to the passenger compartment. Further, the configuration of the airflow outlet 100 is conducive to ease in assembly.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A vehicular airflow outlet comprising:
a plurality of outlet units, each outlet unit including:
   an airflow unit defining a cavity;
   a connection member disposed within the cavity;
   a ball portion coupled to the connection member;
   a first interlocking portion defining a cavity therein for receiving the airflow unit, the first interlocking portion having a first plurality of retention features;
   a second interlocking portion defining a cavity therein for receiving the airflow unit, the second interlocking portion having a second plurality of retention features configured to engage the first plurality of retention features to couple the first interlocking portion and the second interlocking portion;
a control knob unit including a control knob having a first face side and a second connection side, the control knob unit further including a ball portion coupled to the second connection side;
a connection mechanism configured to couple the ball portion of the each of the outlet units and the ball portion of the control knob unit; and
wherein the direction of air flowing through the vehicular airflow outlet is controlled by a force applied to the first face side of the control knob, such that the force applied to the first face side of the control knob is transitioned to the ball portion of the control knob unit and the ball portion of each the plurality of outlet units through the connection mechanism, such that the ball portion of each of the plurality of outlet units and the ball portion of the control knob unit are rotated in unison to adjust airflow direction.

2. The vehicular airflow outlet of claim 1 wherein the connection mechanism further includes:
a plurality of joint sockets, each of the respective joint sockets configured to receive one of the ball portion of one of the outlet units and the ball portion of the control knob unit;
a bracket interlocking array configured to interconnect and couple each of the respective joint sockets.

3. The vehicular airflow outlet of claim 2 wherein an interconnection of the joint socket which houses the ball portion of the control knob unit and the bracket interlocking array is reinforced with an overmold or bracket.

4. The vehicular airflow outlet of claim 3 wherein the overmold or bracket is formed of a polymeric material.

5. The vehicular airflow outlet of claim 1 wherein the control knob unit further includes:
a first interlocking portion defining a cavity therein for receiving the control knob, the first interlocking portion having a first plurality of retention features extending from the first interlocking portion;
a second interlocking portion defining a cavity therein for receiving the control knob, the second interlocking portion having a second plurality of retention features configured to engage the first plurality of retention features to couple the first interlocking portion and the second interlocking portion; and
wherein the first plurality of retention features and second plurality of retention features of each of the respective outlet units and the control knob unit are arranged in an interlocking engagement forming an outlet array.

6. The vehicular airflow outlet of claim 5 wherein the at least one outlet further comprises:

a trim plate defining an interior void, the trim plate configured to encase the outlet array;
a housing defining a cavity therein, the cavity configured to receive the outlet array and the trim plate.

7. The vehicular airflow outlet of claim 5 wherein each of the first interlocking portion and the second interlocking portion of each of the outlet units and the first interlocking portion and second interlocking portion of the control knob unit are formed in the shape of any even sided polygon having at least four sides.

8. The vehicular airflow outlet of claim 7 wherein each of the first interlocking portion and the second interlocking portion of each of the outlet units and the first interlocking portion and second interlocking portion of the control knob unit are formed in the shape of a square.

9. The vehicular airflow outlet of claim 7 wherein each of the first interlocking portion and the second interlocking portion of each of the outlet units and the first interlocking portion and second interlocking portion of the control knob unit are formed in the shape of a hexagon.

10. The vehicular airflow outlet of claim 7 wherein each of the first interlocking portion and the second interlocking portion of each of the outlet units and the first interlocking portion and second interlocking portion of the control knob unit are formed in the shape of an octagon.

11. The vehicular airflow outlet of claim 7 wherein each of the first interlocking portion and the second interlocking portion of each of the outlet units and the first interlocking portion and second interlocking portion of the control knob unit are formed in the shape of a decagon.

12. The vehicular airflow outlet of claim 1 wherein each of the airflow units, the ball portion, and the connection member of each of the respective outlet units are formed of a polymeric material.

13. The vehicular airflow outlet of claim 1 wherein each of the first interlocking portion and the second interlocking portion of each of the respective outlet units are formed of a polymeric material.

14. The vehicular airflow outlet of claim 5 wherein each of the control knob, ball portion, first interlocking portion, and the second interlocking portion of the control knob unit are formed of a polymeric material.

15. The vehicular airflow outlet of claim 2 wherein each of the joint sockets and the bracket interlocking array are formed of a polymeric material.

16. A vehicle having a passenger compartment comprising:
a plurality of airflow outlets including:
   a plurality of outlet units, each outlet unit including:
      an airflow unit defining a cavity;
      a connection member disposed within the cavity;
      a ball portion coupled to the connection member;
      a first interlocking portion defining a cavity therein for receiving the airflow unit, the first interlocking portion having a first plurality of retention features;
      a second interlocking portion defining a cavity therein for receiving the airflow unit, the second interlocking portion having a second plurality of retention features configured to engage the first plurality of retention features to couple the first interlocking portion and the second interlocking portion;
   a control knob unit including a control knob having a first face side and a second connection side, the control knob unit further including a ball portion coupled to the second connection side;
   a connection mechanism configured to couple the ball portion of each outlet unit and the ball joint of the control knob unit; and wherein the direction of airflow flowing through the airflow units is controlled by a force applied to the first face side of the control knob, the force applied to the first face side being operable to simultaneously pivot the ball portions of each of the plurality of outlet units and the ball portion of the control knob unit in unison to adjust airflow direction.

17. The vehicle of claim 16 wherein the connection mechanism further includes:
  a plurality of joint sockets, each of the respective joint sockets configured to receive one of the ball joint of one of the outlet units and the ball joint of the control knob unit;
  a bracket interlocking array configured to interconnect and couple each of the respective joint sockets.

18. The vehicle of claim 16 wherein the control knob unit further includes:
  a first interlocking portion defining a cavity therein for receiving the control knob, the first interlocking portion having a first plurality of retention features extending from the first interlocking portion;
  a second interlocking portion defining a cavity therein for receiving the control knob, the second interlocking portion having a second plurality of retention features configured to engage the first plurality of retention features to couple the first interlocking portion and the second interlocking portion;
  wherein the first plurality of retention features and second plurality of retention features of each of the respective outlet units and the control knob unit are arranged in an interlocking engagement to form an outlet array.

19. The vehicle of claim 17 wherein an interconnection of the joint socket which houses the ball portion of the control knob unit and the bracket interlocking array is reinforced with an overmold or bracket; and wherein the overmold or bracket is formed of a polymeric material.

20. The vehicle of claim 18 wherein each of the airflow outlets further comprises:
  a trim plate defining an interior void, the trim plate configured to encase the outlet array;
  a housing defining a cavity therein, the cavity configured to receive the outlet array and the trim plate.

\* \* \* \* \*